Figure 3:
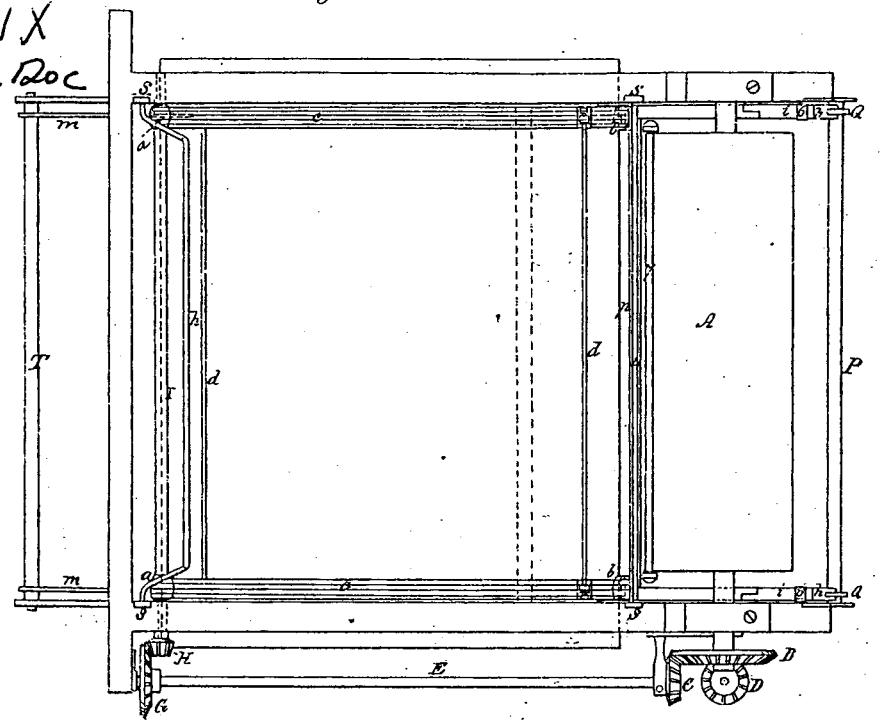

Sheet 1 – 2 Sheets.

J. Arnold.

Forming Bats.

No. 362

Reissued Mar. 18. 1856

5571 X
Relator Doc

Sheet 2 - 2 Sheets.

J. Arnold.

Forming Bats.

No. 362.

Reissued Mar. 18. 1856

5571 X
Related Doc

UNITED STATES PATENT OFFICE.

UNION MANUFACTURING COMPANY, OF NORWALK, CONNECTICUT, ASSIGNEES OF THE LEGAL REPRESENTATIVES OF JOHN ARNOLD, DECEASED.

IMPROVEMENT IN MACHINES FOR FORMING THE WEB FOR CLOTH OF WOOL, HAIR, OR OTHER SUITABLE SUBSTANCE WITHOUT SPINNING OR WEAVING.

5571X Related Doc

Specification forming part of Letters Patent dated July 15, 1829; extended by act of Congress for fourteen years from March 28, 1854; Reissue No. 362, dated March 18, 1856.

*To all whom it may concern:*

Be it known that the following is a full, clear, and exact description of certain new and useful improvements in a certain part of the process of manufacturing cloth by felting without spinning or weaving, invented by JOHN ARNOLD, and for which Letters Patent of the United States were granted to him on the 15th day of July, in the year 1829. The said JOHN ARNOLD having since died, the said Letters Patent were renewed, revised, and extended by an act of Congress approved the 28th day of March, 1854, entitled "An act for the relief of George G. Bishop and the legal representatives of John Arnold, deceased," for the term of fourteen years from and after the passage of said act, and the Commissioner of Patents, in pursuance of the direction to him therefor in said act contained, renewed, revived, and extended the said Letters Patent by making a certificate thereon of such extension to the legal representatives of the said JOHN ARNOLD, deceased, for the term of fourteen years from and after the 28th day of March, 1854; and the said legal representatives having sold, assigned, and transferred the said renewed, revived, and extended Letters Patent to the UNION MANUFACTURING COMPANY, of the town of Norwalk, in the State of Connecticut, by deed of assignment bearing date the 3d day of April, 1854, recorded in the Patent Office on the 2d day of May, 1854, in liber F 3, page 313, of transfers of patent rights, the said company surrendered the same to the Commissioner of Patents for the purpose of describing the same invention and pointing out in what it consists in more clear, full, and exact terms than was done in the original specification.

The principle and object of this invention is to cross the fibers of wool, hair, or other suitable substance at right angles by alternate and repeated process until sufficient thickness is obtained to give, when felted, a body to the cloth of the strength and firmness required, and is effected in the following manner: Two carding-machines in the common form are placed near together at right angles—one to form the warp, the other the weft of the texture of the cloth to be made. These machines are to be connected with a view to uniform motion by one or two shafts placed at suitable angles, with cog-wheels working into a cog-wheel on the shaft of each main cylinder of the carding-machines. The wool or other substance from the card of the first carding-machine, or that designed to form the warp, is received onto an endless creeper or apron of cloth placed over a table, and around two parallel cylinders placed at proper distance to allow the free operation of the other carding-machine, and their distance apart may be greater according to the length of the cloth, the cylinders carrying the apron to be driven by the same power and speed as the doffer of the carding-machine. Underneath this apron is another passing at the same speed, for the purpose of supporting the web on its passage on the under part of the upper creeper, and is carried by a pulley. Over the cylinders of the upper creeper are placed two calender-rollers, for the purpose of pressing down the wool, hair, or other substance as it comes off the doffer, to make it adhere more firmly into a bat, thus forming the incipient warp of the texture. The other carding-machine being placed at right angles with the first, the batten is relieved from the doffer and passes between a pair of guide-rollers moved by a band from the doffer, and through a pair of upper shears, and is then taken by a comb-carrier across the creeper and placed on the warp of the first card as a weft to the cloth in the following manner: This carrier is formed by two stud-wheels and two shaft-wheels, with chains or belts revolving around each stud and shaft wheel, with two combs attached to the chains or belts at an equal distance, to receive and hold the weft, the shaft having a cog-wheel or pulley to connect it with the carding-machine. This chain goes with proper speed to take the wool or other substance from the doffer. This speed may be accelerated or retarded as the occasion may require by the said cog-wheel or pulley being a change-wheel or change-pulley. The wool or other substance is delivered from the comb by a check or pin on the frame coming in contact with a spring placed on the chain, which spring supports the comb in its position until it comes into that contact. The frame of the comb may be made of two pieces of metal and wood, or metal between wood, the teeth to be of metal. Each comb is to be connected with both chains by gudgeons and small stands on each. At the same time that the weft is loosened from the comb it is cut off by the shears and placed on the warp by two fallers. These shears are kept open by levers connected like a pair of scissors, one lever of each pair raising the upper blade and the other levers lowering the under blade. The shears are acted on by a spring which shuts them. These levers are kept open by a wedge moving on arms or a lever connected to a stud. The last-mentioned levers are operated on by a cam placed on a shaft connected with a second carding-machine. The fallers are held in their place by the before-mentioned cam until the revolving of the cam relieves them and they fall by their own weight on the weft, thereby securing it in its proper place. These fallers are attached to knee-levers, which are placed on the frame of the machine in such manner as to permit them to fall on the two ends of the weft at the same time that the shears cut it. They are raised again by the knee-levers, connected by rods with the wedge-levers, which play on the cams. These rods can be shifted to give more or less motion, as may be required. The height and breadth of the frame of this machine must be governed by the height and breadth of the carding-machines attached, the length by the width of the cloth required. The shears and much of the machinery connected with them may be dispensed with and the same results produced by using a doffer for the weft of larger diameter and having a space of three or four inches lengthwise without teeth, by means of which the sheets of weft of the length required will be formed distinct, and may be received directly from the doffer upon or by the comb, and be carried and laid upon the warp in the manner above described.

By reference to the accompanying drawings a more full and clear idea of the operation of the machine may be had.

Figure 4:
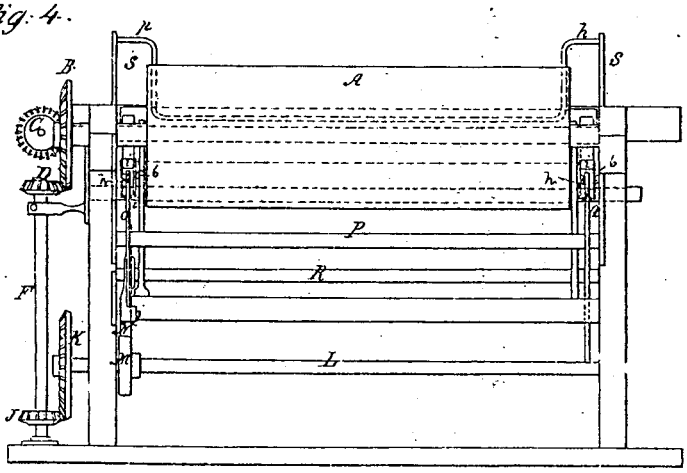
Figure 5:
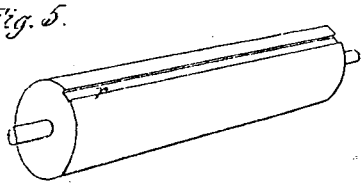
Figure 6:
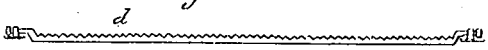
Figure 1:
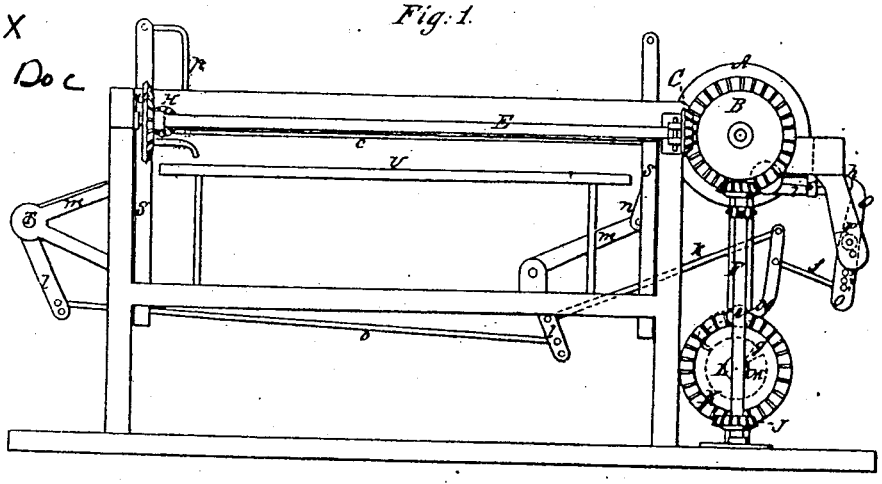
Figure 2:
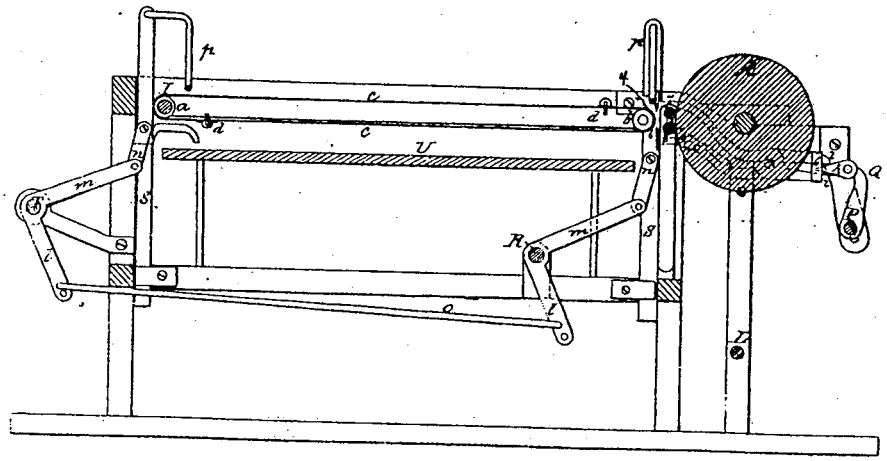

Figure 1 represents a side view of the machine. Fig. 2 represents a vertical longitudinal section through the machine. Fig. 3 represents a top or bird's-eye view. Fig. 4 represents an elevation of one of the ends. Fig. 5 represents a doffer detached, which may be used without the shears for severing the weft, and Fig. 6 represents one of the comb-carriers detached.

Any further description than heretofore given of the carding-machines which furnish the warp and weft to the forming-machine herein illustrated seems superfluous, as they are or may be of the ordinary or well-known kinds, and should stand at right angles to each other—one to deliver the warp, the other the weft. Their dimensions and their speed should of course correspond with the forming-machine which receives the material from them.

Power may be communicated to the machine through the motion of the doffer A, which may represent the doffer of the carding-engine furnishing the weft for the texture. On one end of the shaft or axis of this doffer A is arranged a bevel gear-wheel, B, which operates two bevel-pinions, C D, arranged, respectively, on the shafts E F. The shaft C is a horizontal one, and extends to the opposite end of the machine from the doffer, and is provided at that end with a bevel gear-wheel, G, which meshes with a bevel-pinion, H, on a shaft, I, at right angles to the shaft C, and which shaft I extends entirely across the machine. These shafts are supported, as well as all the others, in suitable bearings, which need not be particularly described. The shaft I has upon it, at or near each of its ends, two slight pulleys or drums, *a*, around which and around two similar pulleys or drums, *b*, on studs in the side pieces of the frame, near the doffer, pass two endless belts or chains, *c c*, which carry two combs, *d d*, which receive from the doffer the material to form the weft and carry it across the warp, and then release it, so that it may be placed on the warp, as heretofore described.

On the lower end of the vertical shaft F is a bevel-pinion, J, which works into a larger bevel-wheel, K, on a shaft, L, and gives motion to said shaft L. The shaft L carries a cam, M, (better seen in dotted lines in Fig. 1,) against the periphery of which cam the point of a bent lever, N, pivoted to the frame at *e*, rests. To the upper arm of this bent lever is connected one end of a rod, *f*, the other end being hooked into one of the series of adjusting-holes 1 2 3 in lever O, permanently fixed upon a rock-shaft, P, so that the motion of the bent lever N, as its point drops into the opening *g* in the face of the cam and is raised out again by the revolving of the cam, shall give a rocking motion to said shaft P. The rock-shaft P, besides the lever O at one of its ends, carries another lever, Q, at its other end, similar to *o*, and to the tops of each of these levers are hinged wedge-shaped pieces *h*, (more distinctly seen in Fig. 2,) which are thrown in between the levers *i i*, to which the shear-blades 4 5 are attached, and open said shear-blades against the action of a spring, 6, around said levers. When the point of the lever N drops into the opening *g* in the cam M, it draws the wedge *h* out from between the levers *i i*, and the spring 6 closes the levers, bringing the shear-blades 4 5 together and severing the weft.

To the top of the lever N is attached one end of a connecting-rod, *k*, the other end being attached to the arm *l* of a bell-crank or two-armed lever, arranged on a shaft, R, and the other arm, *m*, of the bell-crank is connected through a toggle-arm, *n*, to the vertical sliding piece S. The arm *l* of the bell-crank is connected to a bell-crank similar in all respects to itself at the opposite side of the machine on a shaft, T, by means of the rod *o*, and as the shaft R is rocked through the lever N and rod *k* it communicates, through the rod *o* and the arm *l* of another bell-crank, a similar rocking motion to the shaft T. The shafts R and T are both provided at each of their ends with these bell-crank levers, and each of the levers is connected to one of the four rising pieces *s s s s* at the four corners of the frame. These rising pieces having the cam M as their first mover, which cam also operates the shear-blades, of course they work in unison with the shears.

7 and 8 are two guide-rollers, through which the material passes from the doffer to the comb-carrier.

From the tops of the rising pieces *s* are extended fallers *p*, which are bent wires or rods extending across the machine. When the shear-blades are open and the weft is drawn through between them by the comb-carrier, the fallers are raised up; but when the shears close to sever the sliver or sheet of material for weft the fallers drop and knock the sheet of weft, when released from the comb, onto the warp, and this is repeated every time the weft is carried across the warp, U being the table over which the endless crupper or apron of cloth is placed, as hereinbefore stated, to receive the material.

The shears requiring considerable automatic machinery to operate them, I use, in place of them, a doffer such as is shown in Fig. 5. This doffer should be somewhat larger in circumference than the width of the sliver or sheet which forms the warp of the fabric, and a portion of the circumference of the doffer *r*—say about four inches (more or less) longitudinally—is left without teeth or clothing; consequently a sheet or layer will be formed of the length of the perimeter of the doffer minus the space *r*, when it will of course be separated without using shears. The doffer in this case must be regulated in diameter to the width of the warp, so that the weft shall correspond to said width.

Neither the carding-machines nor any parts thereof in common use are claimed as this invention; but

What is claimed is—

1. The combined use of them, as herein described, for the purpose of crossing the fibers of the material of which cloth may be made in the manner and on the principle herein described, and the new machinery necessary to effect that object, particularly the comb-carrier, the means described for severing the weft or web, and the fallers, for placing the weft upon the warp, operated substantially as herein described.

2. The depositing of the weft in separate sheets, edge to edge, upon the continuous sheet of warp, substantially in the manner and for the purpose described.

In testimony whereof the UNION MANUFACTURING COMPANY, of Norwalk, in the State of Connecticut, assignees of the administrator and administratrix of JOHN ARNOLD, deceased, do hereunto cause to be set the seal of our said company before two subscribing witnesses.

[L. S.] STILES CURTIS,
*President.*

Witnesses:
J. W. HUBBELL, Jr.,
JOSEPH W. HUBBELL.